US012662239B2

(12) United States Patent　　　　　　(10) Patent No.:　US 12,662,239 B2
Chasteau et al.　　　　　　　　　　　　(45) Date of Patent:　　Jun. 23, 2026

(54) DOOR FAIRING FOR AN AIRCRAFT LANDING GEAR LEG

(71) Applicant: Airbus Operations Limited, Bristol (GB)

(72) Inventors: Dominique Chasteau, Bristol (GB); Guilherme Barsali, Bristol (GB)

(73) Assignee: Airbus Operations Limited, Bristol (GB)

( * ) Notice: Subject to any disclaimer, the term of this patent is extended or adjusted under 35 U.S.C. 154(b) by 124 days.

(21) Appl. No.: 18/332,328

(22) Filed: Jun. 9, 2023

(65) Prior Publication Data

US 2023/0406485 A1　　　Dec. 21, 2023

(30) Foreign Application Priority Data

Jun. 10, 2022　(GB) ...................................... 2208513

(51) Int. Cl.
B64C 25/16　　　(2006.01)
(52) U.S. Cl.
CPC .................................. B64C 25/16 (2013.01)
(58) Field of Classification Search
CPC . B64C 25/16; B64C 1/1407; B64C 2025/003; B64F 5/00; B64F 5/10; B64F 5/60
See application file for complete search history.

(56) References Cited

U.S. PATENT DOCUMENTS

| 2,484,900 A | | 10/1949 | Mcpherson et al. | |
| 2,670,156 A | * | 2/1954 | Clark | ......................... B64F 1/06 |
| | | | | 244/102 R |
| 4,408,736 A | * | 10/1983 | Kirschbaum | ........... B64C 25/16 |
| | | | | 244/100 R |
| 4,445,657 A | | 5/1984 | Breckenridge | |

(Continued)

FOREIGN PATENT DOCUMENTS

| CN | 102 745 340 A | 10/2012 |
| CN | 109 080 850 A | 12/2018 |

(Continued)

OTHER PUBLICATIONS

Combined Search and Examination Report for GB Application No. 2208513.8 dated Dec. 13, 2022, 5 pages.

(Continued)

*Primary Examiner* — Medhat Badawi
*Assistant Examiner* — Vicente Rodriguez
(74) *Attorney, Agent, or Firm* — Nixon & Vanderhye, PC

(57)　　　　　　ABSTRACT

A door fairing for a retractable landing gear leg of an aircraft is disclosed having an outer member which covers a portion of a landing gear bay of the aircraft when the landing gear leg is retracted. An inner member of the door fairing is coupled to the outer member via a number of configurable couplings which allow adjustment of the position of the outer member with respect to the inner member. The inner member has mounting points for mounting the door fairing to the landing gear leg. Prior to fitting the door fairing at the (Continued)

aircraft, measured or derived dimensional parameters of the landing gear bay are used to adjust the configurable couplings such that the door fairing is preconfigured to fit the landing gear bay of the aircraft.

12 Claims, 5 Drawing Sheets

(56) References Cited

U.S. PATENT DOCUMENTS

| | | | | |
|---|---|---|---|---|
| 7,243,880 | B2 * | 7/2007 | White | B64C 25/16 |
| | | | | 244/129.4 |
| 7,416,156 | B2 | 8/2008 | Hinton | |
| 7,967,245 | B2 | 6/2011 | Seror-Goguet et al. | |
| 9,593,001 | B2 * | 3/2017 | Frizzell | B66F 7/20 |
| 9,643,738 | B2 * | 5/2017 | DesJardien | B64F 5/50 |
| 10,112,699 | B2 | 10/2018 | Simonneaux et al. | |
| 2007/0110552 | A1 | 5/2007 | Groves et al. | |
| 2010/0119343 | A1 | 5/2010 | Groves et al. | |
| 2011/0138574 | A1 | 6/2011 | Bogue et al. | |
| 2013/0056584 | A1 * | 3/2013 | Dierenfeldt | B64F 5/60 |
| | | | | 244/129.4 |
| 2013/0099052 | A1 * | 4/2013 | Gleyze | B64F 5/60 |
| | | | | 244/100 R |
| 2015/0251750 | A1 | 9/2015 | Cook et al. | |
| 2015/0314861 | A1 | 11/2015 | Paddock et al. | |
| 2017/0050830 | A1 | 2/2017 | Podnar | |
| 2017/0106972 | A1 | 4/2017 | Sobajima | |
| 2018/0029697 | A1 | 2/2018 | Ditzler | |
| 2018/0362150 | A1 | 12/2018 | Sakota | |
| 2019/0218840 | A1 | 7/2019 | Hacault | |
| 2019/0300142 | A1 | 10/2019 | Helsley | |
| 2021/0394556 | A1 | 12/2021 | Winters | |
| 2022/0009620 | A1 | 1/2022 | Perkins | |
| 2022/0048614 | A1 | 2/2022 | McMahon | |

FOREIGN PATENT DOCUMENTS

| | | | |
|---|---|---|---|
| CN | 109720555 | A | 5/2019 |
| CN | 209 938 997 | U | 1/2020 |
| CN | 210 391 588 | U | 4/2020 |
| CN | 212 172 576 | U | 12/2020 |
| CN | 112 960 111 | A | 6/2021 |
| CN | 113 428 809 | A | 9/2021 |
| CN | 215 707 227 | U | 2/2022 |
| CN | 215 798 268 | U | 2/2022 |
| EP | 0 597 688 | A1 | 5/1994 |
| EP | 3476714 | A1 | 5/2019 |
| EP | 3 814 232 | B1 | 4/2022 |
| GB | 624 831 | A | 6/1949 |
| GB | 2417933 | A | 3/2006 |
| JP | 2007-154983 | A | 6/2007 |
| JP | 2017-077741 | A | 4/2017 |
| KR | 101 749 982 | B1 | 6/2017 |
| WO | 2005096721 | A2 | 10/2005 |
| WO | 2016/077122 | A1 | 5/2016 |
| WO | 2020260267 | A1 | 12/2020 |

OTHER PUBLICATIONS

Extended European Search Report for Application No. EP 23175512. 5, 12 pages, dated Oct. 5, 2023.
Combined Search and Examination Report for Application No. GB 2207822.4, seven pages, dated 2022.
Search Report for Application No. GB 2304836.6, one page, dated Sep. 11, 2023.
Search Report for Application No. GB 2304839.0, one page, dated Sep. 13, 2023.
Search Report for Application No. GB 2304839.0, one page, dated Feb. 14, 2024.
Search Report for Application No. GB 2304831.7, one page, dated Sep. 22, 2023.
Search Report for Application No. GB2304830.9, one page, dated Sep. 15, 2023.
Search Report for Application No. GB2304828.3, one page, dated Sep. 14, 2023.
Search Report for Application No. GB2304828.3, one page, dated Feb. 15, 2024.
Office Action for U.S. Appl. No. 18/619,590, 11 pages, dated Sep. 26, 2024.
Extended European Search Report for Application No. EP 24165675. 0, seven pages, dated Sep. 10, 2024.
Extended European Search Report for Application No. EP 23178132. 9, 41 pages, dated Nov. 2, 2023.
Office Action U.S. Appl. No. 18/324,796, dated Apr. 23, 2024, twenty pages.

* cited by examiner

DOOR FAIRING FOR AN AIRCRAFT LANDING GEAR LEG

CROSS RELATED APPLICATION

This application claims priority to United Kingdom Patent Application GB 2208513.8, filed Jun. 10, 2022, the entire contents of which is hereby incorporated by reference.

BACKGROUND OF THE INVENTION

The present invention relates to door fairings for aircraft landing gear legs. More particularly, but not exclusively, this invention concerns door fairings for aircraft landing gear legs which cover aircraft landing gear bay apertures when the landing gear is retracted.

Door fairings are typically provided on aircraft landing gear legs in conjunction with landing gear doors and other components to provide a clean and unbroken surface on the underside of the aircraft when the landing gear is retracted. By way of example, FIG. 1a shows an aircraft 101 having landing gear door components 110 including landing gear doors and door fairings in a closed configuration, with the associated landing gear assemblies (not shown) retracted in their respective landing gear bays.

FIG. 1b shows a portion of the aircraft 101 with a landing gear bay 130 and a landing gear assembly 120 together with associated components (landing gear door 140, door fairing 150 and hinged leg fairing 160) in an extended configuration.

To prevent or impede the ingress of water, dirt and other foreign bodies into the landing gear bay 130, these components should all fit together as closely as possible when the landing gear assembly 120 is retracted. Furthermore for aerodynamic efficiency (minimum profile drag) the overall surface of the underside of the fuselage 105 and wings 106 should be as 'clean' as possible when the landing gear is retracted, so it is also important that the edges of these components mutually align and follow the contours (or loft lines) of the underside of the aircraft as closely as possible without protrusions or recesses.

It is also critical that none of the above components interfere with each other, since any fouling of one component with respect to another could lead to damage and potentially a landing gear extension/retraction failure.

Therefore each of the components must be carefully aligned when installed on the aircraft 101. This is especially true of the landing gear door fairing 150. Firstly it is not mounted directly to fixed structure of the aircraft 101, but to the main leg of the landing gear assembly 120, which does not have a well-defined position within the landing gear bay 130 due to the complicated kinematics and the required design, manufacturing and installation tolerances of the landing gear assembly 120. Secondly the landing gear door fairing 150 is required to be, when retracted, in correct alignment with the following elements: the landing gear door 140, the hinged leg fairing 160 and the sides of the landing gear bay 130.

FIG. 2 shows a landing gear fairing 200 having adjustable fittings 220 and 230 respectively which, given the requirement for a clean and unbroken outer surface 205 on the underside of the aircraft, are only adjustable from a position adjacent an inner surface 210 of the fairing 200 (labelled 220a and 230a in FIG. 2).

A typical process of fitting and adjusting the fairing 200 to the aircraft 101 requires initial attachment of the fairing 200 to the landing gear leg with the adjustable fittings 220 and 230 respectively being loosened so that the fairing 200 has some 'play'. The landing gear leg to which the fairing 200 is attached is then very slowly and carefully retracted (with the aircraft on jacks or stands), and just prior to complete retraction of the landing gear leg the fairing 200 is carefully manipulated by hand in order to align it with corresponding surfaces and elements. This involves adjustment to ensure that there are gaps between the fairing and its surrounding components within acceptable ranges.

Once the fairing 200 has been adjusted so that it will fit within the space without any overlap with surrounding components, the landing gear leg is then fully retracted, and further manipulation of the fairing 200 is performed in order remove any 'steps', i.e. the fairing 200 should neither protrude nor be recessed with respect to the surrounding components.

With the fairing 200 so aligned, the landing gear leg is then partially re-extended slowly and carefully, in order for the adjustable fittings 220 and 230 to be tightened with the fairing 200 in approximate alignment.

The landing gear leg is then once again retracted, and any gaps and areas of non-alignment are reviewed. If necessary further partial extension of the landing gear leg is then performed in order to make readjustments to the adjustable fittings 220 and 230, followed by further retraction of the landing gear leg to further check the position and alignment of the fairing 200. This process may have to be repeated several times.

Therefore this process is often slow, complex and inefficient. Furthermore the repeated extension and retraction of the landing gear increases the risk of damage occurring during this process.

The present invention seeks to mitigate one or more of the above-mentioned problems. Alternatively or additionally, the present invention seeks to provide an improved door fairing for an aircraft landing gear leg, and an improved method of fitting a door fairing to a retractable landing gear leg of an aircraft.

SUMMARY OF THE INVENTION

The present invention provides, according to a first aspect, a door fairing for attachment to a retractable landing gear leg of an aircraft. An outer member of the door fairing provides a door for an orifice of the aircraft when the retractable landing gear leg is in a retracted position. The aircraft has at least one dimensional parameter, which may be a parameter relating to the position/location of a portion of the orifice (i.e. one edge of a landing gear bay) or of a component such as a landing gear door or another fairing. An inner member of the door fairing is coupled to the outer member via a plurality of configurable couplings. The door fairing has at least one mounting device for mounting the inner member, and therefore the door fairing, to the retractable landing gear leg. For example, the inner member has one or more (e.g. a plurality of) mounting arms for mounting the door fairing to the retractable landing gear leg. The plurality of configurable couplings facilitate adjustment of the position of the outer member with respect to the inner member in dependence upon said at least one dimensional parameter. The plurality of configurable couplings may be double-ball joints or similar couplings which between them allow movement in, and rotation about, the x-, y- and z-axes.

In embodiments, the mounting device (e.g. mounting arms) are arranged to provide a repeatable and reliable means for mounting the door fairing to the retractable landing gear, there being a fixed, known and well-determined geometrical relationship between the inner member and the landing gear leg. The geometrical relationship between the inner member and the outer member is configurable with multiple degrees of freedom by means of the configurable couplings. In this way the door fairing is pre-configurable with respect to the orifice prior to being attached to the retractable landing gear leg. Said at least one dimensional parameter may include (or be) a measured distance (optionally with a defined direction) from a datum point to an element to which the door fairing is intended to align.

It may be that said at least one dimensional parameter comprises a parameter that concerns the position of a landing gear door of the aircraft. It may be that said at least one dimensional parameter comprises a parameter that concerns the position of a hinged leg fairing of the aircraft. It may be that said at least one dimensional parameter comprises a parameter that concerns the position of at least one of the forward and rear walls of a landing gear bay of the aircraft.

In embodiments, pre-configuring the door fairing to pre-rig the positions of its outer dimensions to align with dimensional characteristics of the aircraft, enables the final attachment of the door fairing to the aircraft to be simplified. Fewer steps may then be required to adjust the door fairing in its final position. This may also reduce the risk of damage to the door fairing or to the aircraft occurring during this process.

The plurality of configurable couplings are preferably separate from the mounting device (e.g. the plurality of mounting arms). For example, at least one and preferably all of the plurality of configurable couplings may each be spaced apart from each of the mounting arms in a direction parallel to an outer surface of the outer member. It may be that each of the plurality of configurable couplings are spaced apart from each other in a direction parallel to the outer surface of the outer member. The two configurable couplings that are spaced apart from each other by the further distance may be spaced apart by more than 0.1 m, possibly more than 0.5 m. Preferably the plurality of mounting arms comprise three mounting arms. In embodiments, this may provide a sufficient number of separate spaced apart attachment points between the inner member and the landing gear leg as to provide a repeatable fixed and known geometrical relationship between the inner member and the landing gear leg, with acceptable tolerances.

The plurality of configurable couplings preferably comprise at least five configurable couplings. In embodiments, this may provide sufficient configurability of the relative position of the outer member relative to the inner member to cater for substantially all likely required repositioning adjustments of the outer member (and therefore outer door surface) relative to the orifice. It may be that the plurality of configurable couplings comprise at least one coupling which allows for adjustment of the position of the outer member relative to the inner member in a first direction (for example, being a direction having a component perpendicular to the outer surface of the outer member). It may be that there is at least one coupling which allows for adjustment of the position of the outer member relative to the inner member in a second direction (for example, being a direction having a component perpendicular to the outer surface of the outer member or, optionally being a direction transverse to the first direction). It may be that there is at least one coupling which allows for adjustment of the position of the outer member relative to the inner member in a third direction. The third direction may be both non-parallel to the first direction and non-parallel to the second direction. It may be that the same at least one coupling provides for the adjustment in the first direction, in the second direction, and/or the third direction. It may be that one coupling is connected between the inner member and the outer member via another coupling, optionally with an intermediate member between the couplings.

The inner member may comprise a frame. The inner member may have a width and a length (or two orthogonal dimensions both in the plane of the inner member), which when multiplied together define an area that is greater than 0.1 m $2$, optionally greater than 1 m $2$. It is preferred for the structure of the inner member to extend over an area that encompasses all of the configurable couplings.

According to a second aspect of the invention there is provided a retractable landing gear leg of an aircraft incorporating a door fairing according to any aspect of the invention as described or claimed herein. Similarly, there is provided an aircraft including a door fairing according to any aspect of the invention as described or claimed herein. The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft. For the purposes of the present specification the term commercial passenger aircraft also covers aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

According to a third aspect of the invention an aircraft a kit comprising a jig and a door fairing is provided. Adjustment of the position of the outer member with respect to the inner member is arranged to be performed with the door fairing mounted on the jig.

Preferably the jig has at least one element arranged in dependence upon said at least one dimensional parameter such that the door fairing is configured with reference to said at least one element of the jig.

According to a fourth aspect of the invention an aircraft a method of fitting a door fairing to a retractable landing gear leg of an aircraft is provided. In embodiments, the door fairing is configured such that (for example, immediately before a step of fitting it to the landing gear) it has at least one adjustable dimension that can be configured to compensate for variations which affect the fit of the door fairing with the aircraft (for example, when the landing gear leg is retracted). Such variations may for example be variations from one aircraft of a given design to another, that arise as a result of dimensional tolerances. The method comprises a step of prior to fitting the door fairing to the retractable landing gear leg of the aircraft, configuring at least one dimension of the door fairing (e.g. the aforesaid at least one adjustable dimension) in dependence upon at least one dimensional parameter of the aircraft. The door fairing is then fitted to the retractable landing gear leg of the aircraft. In this way the door is pre-configured to fit the orifice of the aircraft when the landing gear leg is retracted.

The door fairing preferably includes an outer member and an inner member coupled to the inner member via a plurality of configurable couplings arranged to facilitate adjustment of the position of the outer member with respect to the inner member. In this way the step of configuring at least one dimension of the door fairing may comprise adjusting at least one of the plurality of configurable couplings.

Preferably the step of configuring at least one dimension of the door fairing is performed with the door fairing mounted on a jig. The step of configuring at least one dimension of the door fairing preferably includes using at least one guide element attached to the jig. In this way said at least one element is positioned in dependence upon said at least one dimensional parameter such that the door fairing is configured with reference to the guide element.

Preferably the step of configuring at least one dimension of the door fairing includes using optical guidance device, such as a camera, laser system or the like, to determine a target position for the door fairing in dependence upon said at least one dimensional parameter.

Said at least one dimensional parameter may include a measurement taken at the aircraft. Said at least one dimensional parameter may include a parameter derived from statistical analysis of a series of dimensional parameters corresponding to a plurality of different aircraft. For example, at least one dimensional parameter may be derived from statistical analysis of a series of dimensional parameters measured at a plurality of aircraft.

Preferably there are at least four dimensional parameters. Alternatively there may be fewer or more than four dimensional parameters.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figures 1A, 1B:
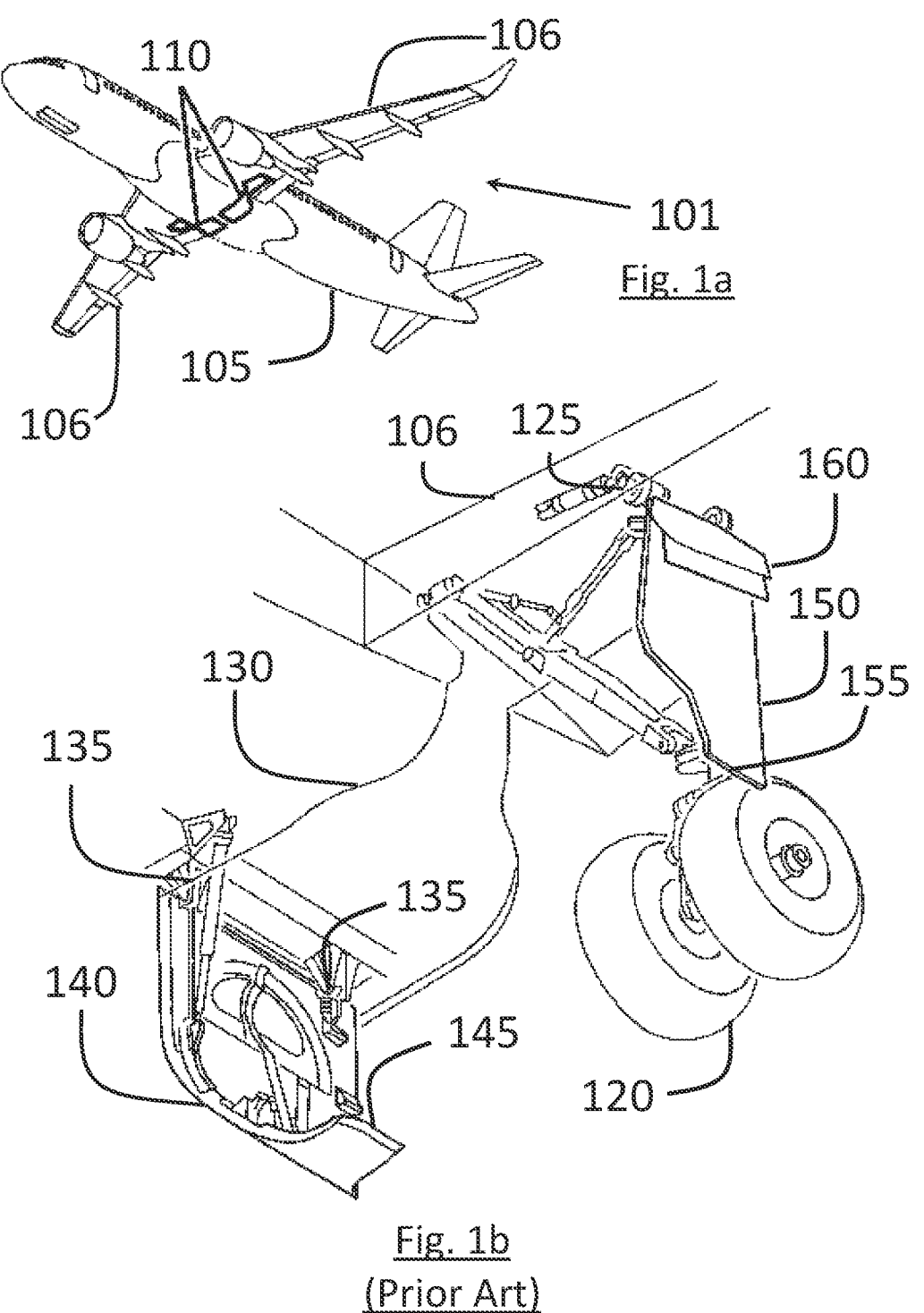
FIGS. 1a and 1b show a prior art arrangement of an aircraft with retractable landing gear.
Figure 2:
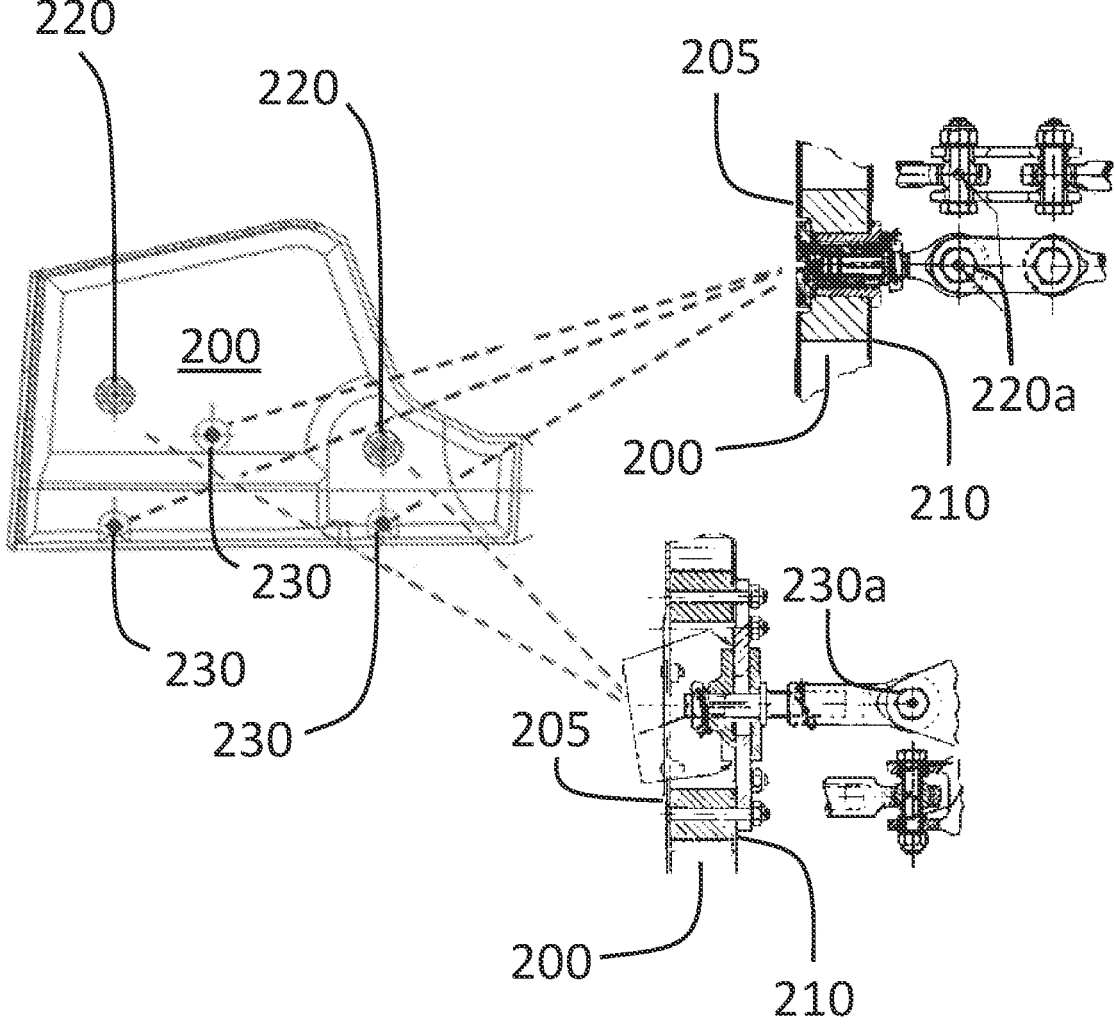
FIG. 2 shows an aircraft landing gear door fairing.

FIG. 1a shows an aircraft 101 comprising a fuselage 105 and a pair of wings 106. The aircraft 101 also includes sets of landing gear door components 110, which provide a contiguous covering at the underside of the fuselage 105 and the pair of wings 106 for main landing gear assemblies (not shown) when in a retracted configuration.

Referring now also to FIG. 1b, a portion of the aircraft 101 is depicted with the left (port) side of the landing gear door components 110 of FIG. 1a shown in greater detail, now in an extended (deployed) position. These comprise a landing gear door 140, a landing gear door fairing 150, and hinged leg fairing 160. A main landing gear assembly 120 of the aircraft 101 is pivotally coupled to the wing 106 via pintles 125, such that when retracted the main landing gear assembly 120 is housed within a landing gear bay 130.

As mentioned above the landing gear door 140, landing gear door fairing 150, and hinged leg fairing 160 fit together when the main landing gear assembly 120 is retracted to form a contiguous covering of the landing gear bay 130. The landing gear door 140 is pivotally coupled via hinged mounts 135 to the fuselage 105, such that when the main landing gear assembly 120 is retracted, the landing gear door 140 partially closes the landing gear bay 130.

The landing gear door fairing 150 is attached to a main leg of the main landing gear assembly 120, such that when the main landing gear assembly 120 is retracted, the landing gear door fairing 150 also partially closes the landing gear bay 130. Furthermore, when the main landing gear assembly 120 is retracted, a lower edge 155 of the landing gear door fairing 150 is arranged to abut an edge 145 of the landing gear door 140.

Similarly a hinged leg fairing 160 is attached to the wing 106 via a hinged joint 125 such that when the main landing gear assembly 120 is retracted, the hinged leg fairing 160 rotates about the hinged joint 125 to close the hinged leg fairing 160. When closed, the hinged leg fairing 160 abuts an edge of the landing gear door fairing 150 (opposite the lower edge 155). In this way the arrangement of the landing gear door 140, landing gear door fairing 150, and hinged leg fairing 160 together close the landing gear bay 130 to the exterior when the main landing gear assembly 120 is retracted.

Since the landing gear door fairing 150 is not mounted to the aircraft 101 directly, but to the main leg of the main landing gear assembly 120 (which itself is subject to design, manufacturing and installation tolerances and must be fitted and suitably adjusted on the aircraft 101), it will be appreciated that significant adjustment of the position of the landing gear door fairing 150 may be required in order to achieve the abovementioned mutual alignment.

Figures 3, 4:
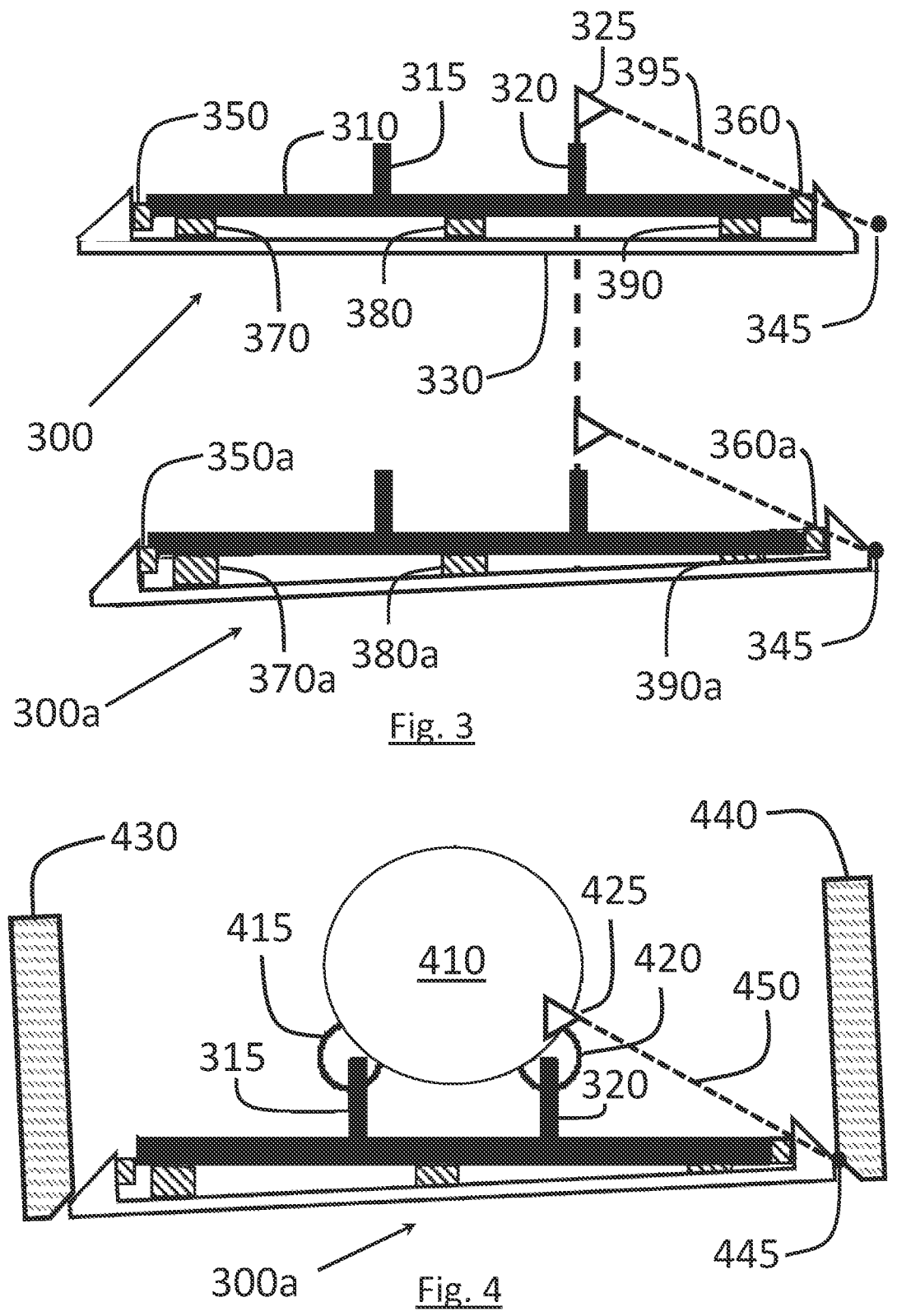
FIG. 3 show a landing gear door fairing according to a first embodiment of the invention.
FIG. 4 shows the landing gear door fairing of FIG. 3 fitted to a landing gear leg.

Referring now also to FIG. 3, a landing gear door fairing 300 is shown, which is suitable for being mounted on the main landing gear assembly 120 of the aircraft 101 according to a first embodiment of the invention. The landing gear door fairing 300 has an outer member 330 and an inner member 310. The inner member 310 is provided with first and second mounting arms 315 and 320 respectively for mounting the landing gear door fairing 300 to the aircraft 101 in a manner to be fully described below. It will be appreciated that the number of mounting arms may differ from that described above, and that in particular the provision of three mounting arms provides an advantageous arrangement in terms of the security of attachment and orientation of the landing gear door fairing 300 when mounted on the aircraft 101.

The outer member 330 is coupled to the inner member 310 by five configurable couplings 350, 360, 370, 380 and 390 respectively.

Each one of the five configurable couplings 350, 360, 370, 380 and 390 respectively is adjustable so as to be able to adjust the overall relative position of the inner member 310 with respect to the outer member 330. This may be achieved by, for example, the use of double-ball joints with telescopic arms or a selection of differently sized spacers. This allows adjustment in x-, y-, and z-axes, plus the three degrees of freedom of rotation. In other words all six degrees of freedom of movement.

It will be appreciated that the five configurable couplings 350, 360, 370, 380 and 390 respectively will be accessible from the sides of the landing gear door fairing 300, or via access holes or panels provided in the inner member 310. In this way configuration and adjustment of each one of the five configurable couplings 350, 360, 370, 380 and 390 respectively is facilitated, in a manner to be further described below.

It will also be appreciated that the precise arrangement of configurable couplings may vary from the five described above. Furthermore outer member 330 is illustrative of one landing gear door fairing example, other landing gear door fairing designs may have differently shaped outer member components to those described above, but with the common feature that the outer member is designed to fit within a specific space, and be oriented correctly to the 'loft lines' (i.e. contours) of the underside of the wing 106 and/or fuselage 105 into which the main landing gear assembly 120 is designed to recess when retracted.

A datum reference point 325 defines a fixed point with respect to the second mounting arm 320, and therefore by extension a fixed point with respect to the whole inner member 310.

In operation, and referring now to the lower portion of FIG. 3, dimensional constraint parameters of the aircraft to which the landing gear door fairing 300 is to be fitted are provided. These dimensional constraint parameters may be measurements taken at the aircraft 101, or may be based on statistical or other data related to a fleet of aircraft, or a portion thereof. For example it may be that at a Final Assembly Line (FAL), the most recently assembled aircraft have been found to have an internal spatial relationship (represented by the dashed line 395) between the datum reference point 325 and one corner of a landing gear bay (represented by a reference point 345). In this example the reference point 345 may a corner where a rear sidewall of the landing gear bay 130 meets an edge of the hinged leg fairing 160 of aircraft 101, so an edge of outer member 330 should be dimensionally adjusted to that point in order that the landing gear door fairing 300 will make a flush fit with this corner.

It will be appreciated that the spatial relationship referred to above may be defined and provided as a parameter in a number of different ways, such as using relative orthogonal coordinates (x, y, z mm) from the datum point 325, within a predefined coordinate system having well defined x-, y-, and z-axes.

Thus by way of example only, a pre-adjusted landing gear door fairing 300a is shown, which is a representation of landing gear door fairing 300 but with each one of the five configurable couplings 350, 360, 370, 380 and 390 having been adjusted to new positions as shown by the five configurable couplings 350a, 360a, 370a, 380a and 390a in dependence upon a number of dimensional constraint parameters. As will be appreciated, this difference in spacing alters the position of the outer member 330 relative to the inner member 310. In the example shown, while the inner member 315 remains in the same position with respect to the datum point 325, the position of the outer member 330 relative to both the inner member 310 and the datum point 325 is adjusted. In particular, a corner of the outer member 330 has been adjusted to now coincide with the reference point 345, such that the outer member 330 is now preconfigured to correspond to the spatial characteristic of the aircraft 101 referred to above.

For the sake of clarity, only one reference point 345 is shown in FIG. 3. However it will be appreciated that a number of reference points may be required in order to provide all of the required spatial characteristics such that the outer member 330 of the landing gear door fairing 300a is preconfigured to fit the required area and contours of the aircraft 101. In particular it may be that four reference points defined by four dimensional constraint parameters are sufficient to align the outer member 330 with the required spatial characteristics of the aircraft 101.

Referring now also to FIG. 4, a landing gear leg 410 of the aircraft 101 of FIG. 1a is shown having first and second mounting points 415 and 420. The landing gear door fairing 300a which has been pre-configured as described above, is mounted to the landing gear leg 410 via the first and second mounting arms 315 and 320 which are fixed to the first and second mounting points 415 and 420 respectively via conventional and resilient means such as a bolt and captive-nut arrangement.

It will be appreciated that the resilient nature of this fixing of the mounting arms 315 and 320 respectively to the first and second mounting points 415 and 420 results in the inner member 310 having a fixed orientation with respect to the landing gear leg 410. Sidewalls 430 and 440 of FIG. 4 define the front and rear edges respectively of an orifice which is part of a landing gear bay into which the landing gear leg 410 is housed when retracted. For example sidewalls 430 and 440 may correspond to the front and rear edges of the landing gear bay 130 of the aircraft 101 of FIG. 1b.

Datum point 425 of FIG. 4 corresponds to datum point 325 of FIG. 3. As described above, a corner of outer member 330 has been preconfigured such that when mounted on the aircraft 101, the corner of outer member 330 aligns with the edge of the sidewall 440 at reference point 445. In this way the position of the landing gear door fairing 300a matches the required spatial characteristic (reference point 445) namely the edge of the sidewall 440. Similarly the spatial characteristics of other elements such as the sidewall 430 or other elements not shown in FIG. 4, are also matched through the preconfiguring described above.

Figure 5:
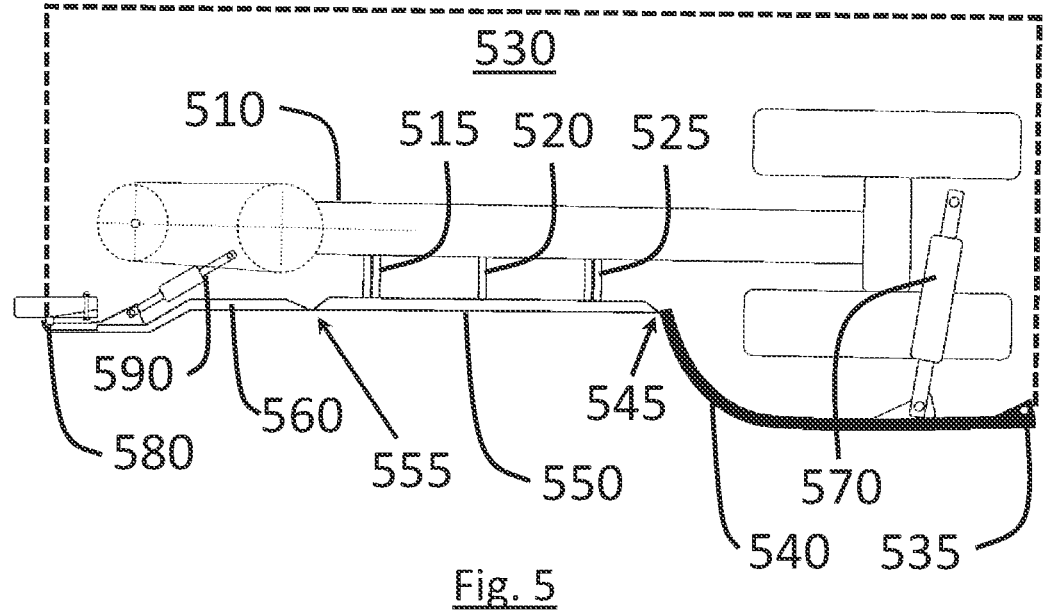
FIG. 5 shows the arrangement of FIG. 4 in an alternative aspect.

Referring now also to FIG. 5, a landing gear leg 510 (which corresponds to landing gear leg 410 of FIG. 4 but viewed from the side) is shown in a retracted position within a landing gear bay 530 of aircraft 101. A landing gear door fairing 550 is coupled to the landing gear leg 510 via first, second and third mounting points 515, 520 and 525 respectively. The landing gear door fairing 550 has already been preconfigured according to the procedure referred to above and below, in order to satisfy the dimensional requirements of the landing gear bay 530 (the five configurable couplings being omitted for clarity).

A landing gear door 540 (which corresponds to the landing gear door 140 of FIG. 1b) is coupled to the aircraft 101 via a hinged joint 535 (corresponding to the joint 135 of FIG. 1b), and is actuated by a hydraulic actuator 570, one end of which is coupled to structure of the aircraft 101. In this way the landing gear door 540 is opened prior to extension of the landing gear leg 510, and closed after retraction of the landing gear door leg 510.

A hinged leg fairing 560 (which corresponds to the hinged leg fairing 160 of FIG. 1b) is coupled to the aircraft 101 via a hinged joint 580 (corresponding to the joint 125 of FIG. 1b), and is actuated by a hydraulic actuator 590, one end of which is coupled to the landing gear leg 510. In this way the hinged leg fairing 160 is opened with, or just prior to the extension of the landing gear leg 510, and closed with or just after retraction of the landing gear door leg 510.

When the landing gear leg 510 is retracted landing gear door 540, the landing gear door fairing 550 and the hinged leg fairing 560 form a contiguous covering of the landing gear bay 530. Since the landing gear door fairing 550 has been preconfigured according to the procedure referred to above and below, the landing gear door fairing 550 is aligned with the edge of the landing gear door 540 (arrow 545) and the edge of the hinged leg fairing 560 (arrow 555).

Figure 6:
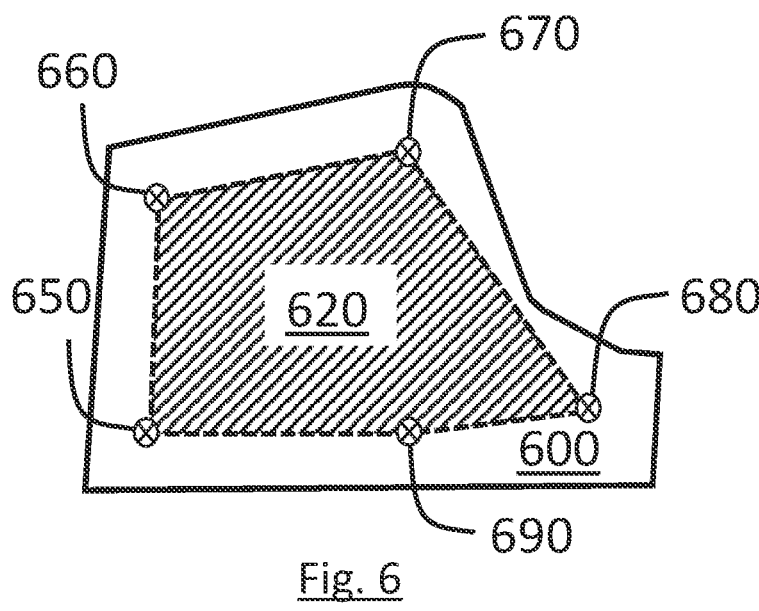
FIG. 6 shows in plan view the landing gear door fairing of FIG. 3.

Referring now also to FIG. 6, a landing gear door fairing outer member 600 (corresponding to the outer member 330 of FIG. 3) is shown in plan view, with five locations 650, 660, 670, 680 and 690 respectively where the five configurable couplings 350, 360, 370, 380 and 390 respectively of FIG. 3 may, by way of example only, be located.

A frame 620 (corresponding to the inner member 310 of FIG. 3) is coupled to the outer member 620 via configurable couplings at the five locations 650, 660, 670, 680 and 690 respectively. Mounting points of the frame 620 (for attachment to the aircraft 101) are omitted for clarity.

Figure 7:
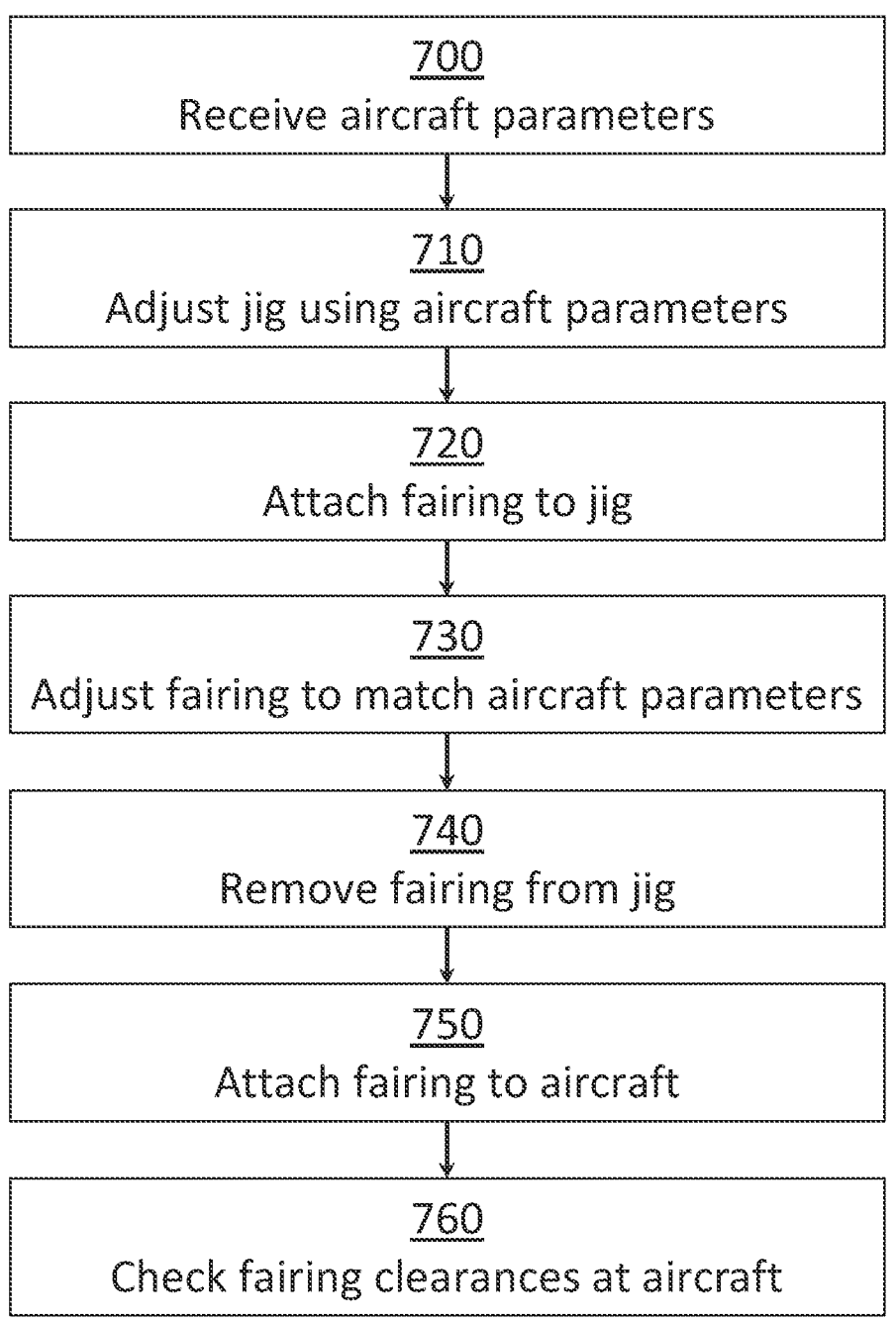
FIG. 7 shows a flow diagram illustrating a method of attaching a landing gear door fairing to an aircraft according to a further embodiment of the invention.

In operation and referring now also to FIG. 7, a method of fitting a landing gear door fairing is described. At box 700, parameters of the aircraft 101 to which the landing gear door fairing 300 is to be fitted are received at a maintenance facility or assembly line. The parameters may represent spatial characteristics such as distances, internal dimensions, angles and other geometric values indicative of the required orientation and position of the landing gear door fairing 300 when attached to the aircraft 101. The parameters may, for example, relate to one or more points indicating the location (with respect to a known datum) of one or more of the following:

a) front and rear edges of a landing gear bay such the sidewalls 430 and 440 of the landing gear bay 130 of FIG. 4, b) an edge of a landing gear door (such as the landing gear door 540 of FIG. 5), c) an edge of a hinged leg fairing (such as hinged leg fairing 560 of FIG. 5), and d) points where any two of the edges of a, b or c above meet.

These parameters may be measurements taken at the specific aircraft to which the landing gear door fairing 300 is intended to be fitted. Alternatively they may be based on statistical analysis of, for example, several aircraft of the same type as aircraft 101. Alternatively such statistical analysis may be derived from historical information stored relating to pre-adjustments made to other landing gear door fairings which have recently been adjusted for the same aircraft type.

It will be appreciated that the parameters may be provided in the form of a list, or by data to be read and interpreted by a computer (not shown).

At box 710, a jig is adjusted according to the received parameters from box 700. The jig may be provided with adjustable guide elements corresponding to elements of the aircraft 101, or there may be a number of reference points spatially distributed within the jig. The received parameters are used to adjust the position of the guide elements, or to specify required distances relative to the reference points in a manner to be further described below.

Alternatively the jig may be provided with one or more optical devices such as laser or camera guidance systems, which may be arranged detect the position of various elements of the door fairing 300 and to provide guidance, in dependence upon the received parameters, to a user of the system for adjusting the five configurable couplings 350, 360, 370, 380 and 390 respectively.

At box 720 the landing gear door fairing 300 is attached to the jig. This is preferably achieved via one or both of the first and second mounting arms 315 and 320 respectively.

At box 730 the five configurable couplings 350, 360, 370, 380 and 390 respectively of the landing gear door fairing 300 are each adjusted in order that the position of the outer member 330 conforms to the requirements specified by the parameters received above at box 700. This may be achieved by aligning the outer member 330 with the guide elements described above. Alternatively the position of the outer member 330 may be adjusted to satisfy required distances from the reference points as determined by an optical device such as laser or camera guidance system. For example edges of the outer member 330 may be temporarily fitted with visual target elements to be identified by the guidance system, such that the guidance system can recognise the positions of the edges of the outer member 330 and therefore specify the required adjustments to be made to the five configurable couplings 350, 360, 370, 380 and 390 respectively.

The five configurable couplings 350, 360, 370, 380 and 390 respectively are then tightened/locked in their adjusted positions. This may include the provision of locking wire, especially if the dimensional parameters described above are well defined and therefore there is a high degree of confidence that no further adjustment will be necessary when the landing gear fairing 300 is fitted to the aircraft.

It will be appreciated that adjusting the position of the outer member with respect to the inner member 310 on the jig is significantly faster and more straightforward than if the adjustments were made when the landing gear fairing 300 were attached to the landing gear leg 410 of the aircraft 101.

At box 740, the landing gear fairing 300*a* (after adjustment) is removed from the jig, and transferred to the location of the aircraft 101. It will be appreciated that the jig may be at the same facility as the aircraft 101, or it may be at a different location.

At box 750, the landing gear fairing 300*a* is attached to the landing gear leg 410 of aircraft 101.

Finally, at box 760, the landing gear leg 410 is retracted in order to verify that the correct position and clearances have been achieved.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

For example, the jig could be provided with a computer controlled optical system with lasers, cameras or other detection devices attached to a computer. The system is arranged to process the received parameters and provide instructions on a screen for the required manual adjustment of the five configurable couplings 350, 360, 370, 380 and 390 respectively.

It will be appreciated that the number of configurable couplings could be fewer or greater than the five configurable couplings 350, 360, 370, 380 and 390 described above. Furthermore the number of mounting points may be fewer or greater than the three mounting points 515, 520 and 525 described above.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of fitting a door fairing to a retractable landing gear leg of an aircraft, the door fairing being configured such that immediately before a step of fitting the door fairing to the retractable landing gear the door fairing has at least one adjustable dimension that are configurable to compensate for variations, from one aircraft to another, that arise as a result of dimensional tolerances which affect fitting of the door fairing with the aircraft when the retractable landing gear leg is retracted, the method comprising:

prior to fitting the door fairing to the retractable landing gear leg of the aircraft, remotely configuring at least one dimension of the door fairing in dependence upon at least one dimensional parameter of the aircraft so that the door fairing is pre-configured to fit an orifice of the aircraft when the retractable landing gear leg is retracted;

transferring the door fairing to an attachment point of the aircraft; and then fitting the door fairing to the retractable landing gear leg of the aircraft.

2. The method according to claim 1, wherein the door fairing includes an outer member coupled to an inner member via a plurality of configurable couplings arranged to facilitate adjustment of the position of the outer member with respect to the inner member; wherein the step of configuring at least one dimension of the door fairing comprises adjusting one or more of the plurality of configurable couplings.

3. A method of fitting a door fairing to a retractable landing gear leg of an aircraft, the door fairing being configured such that immediately before a step of fitting the door fairing to the retractable landing gear the door fairing has at least one adjustable dimension that are configurable to compensate for variations, from one aircraft to another, that arise as a result of dimensional tolerances which affect the fit of the door fairing with the aircraft when the retractable landing gear leg is retracted, wherein the door fairing includes an inner member, the method comprising:

mounting the inner member on a jig prior to fitting the door fairing to the retractable landing gear leg of the aircraft, remotely configuring at least one dimension of the door fairing in dependence upon at least one dimensional parameter of the aircraft so that the door fairing is pre-configured to fit an orifice of the aircraft when the retractable landing gear leg is retracted;

transferring the door fairing to an attachment point of the aircraft; and then fitting the door fairing to the retractable landing gear leg of the aircraft.

4. The method according to claim 3, wherein the step of configuring at least one dimension of the door fairing includes using an optical guidance device to determine a target position for the door fairing in dependence upon said at least one dimensional parameter.

5. The method according to claim 1, wherein said at least one dimensional parameter includes a measurement taken at the aircraft.

6. The method according to claim 1, wherein said at least one dimensional parameter includes a parameter derived from statistical analysis of a series of dimensional parameters corresponding to a plurality of different aircraft.

7. The method according to claim 1, wherein said at least one dimensional parameter comprises at least four dimensional parameters.

8. The method according to claim 1, further comprising providing at least one mounting device for mounting an inner member to the retractable landing gear leg.

9. The method according to claim 2, further comprising providing a plurality of mounting arms for said at least one mounting device, and wherein the plurality of mounting arms is separate from the plurality of configurable couplings.

10. The method according to claim 2, wherein the plurality of configurable couplings comprises at least five configurable couplings.

11. The method according to claim 2, wherein the plurality of configurable couplings comprises:

at least one coupling which allows for adjustment of the position of the outer member relative to the inner member in a first direction which has a component perpendicular to the outer surface of the outer member;

at least one coupling which allows for adjustment of the position of the outer member relative to the inner member in a second direction which has a component perpendicular to the outer surface of the outer member; and at least one coupling which allows for adjustment of the position of the outer member relative to the inner member in a third direction which is both non-parallel to the first direction and non-parallel to the second direction.

12. The method according to claim 3, wherein the step of configuring at least one dimension of the door fairing includes using at least one guide element attached to the jig, said at least one guide element being positioned in dependence upon said at least one dimensional parameter such that the door fairing is configured with reference to the guide element.

* * * * *